A. C. JOHNSON.
Ball-Target.

No. 210,856.    Patented Dec. 17, 1878.

Witnesses.
Daniel E. Powers
Thomas Hamilton

Inventor.
Alfred C. Johnson

UNITED STATES PATENT OFFICE.

ALFRED C. JOHNSON, OF PLAINFIELD, NEW JERSEY.

IMPROVEMENT IN BALL-TARGETS.

Specification forming part of Letters Patent No. 210,856, dated December 17, 1878; application filed August 5, 1878.

*To all whom it may concern:*

Be it known that I, ALFRED C. JOHNSON, of Plainfield, Union county, State of New Jersey, have invented new and useful Improvements in Targets; and I do hereby declare that the following is a full, clear, and exact description thereof, reference being had to the accompanying drawings, making part of this specification, in which—

Figures 1, 2, 3, and 4 represent my invention.

The nature of my invention consists in a spherical, or nearly spherical, target, made in two or more parts, with a groove passing round it to retain a rubber band or other suitable securing device, substantially as shown.

Figure 1:
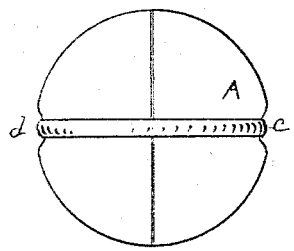
Figure 2:
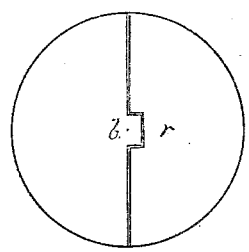
Figure 3:
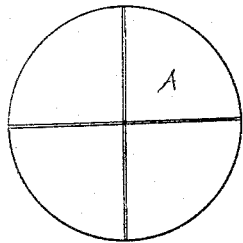

A in the accompanying drawings represents a side elevation of a spherical ball for target, constructed in two halves, and held together by means of a rubber band, $c$, drawn over the two halves at right angles to the parting, as shown in Fig. 1. To retain this band in position on the surface of the target, in order to hold the two halves together firmly during its flight, a groove, $d$, is formed to receive this band, which prevents its slipping sidewise thereon. A mortise and tenon, $b\ r$, may be employed, if found desirable, to retain the edges of the sections evenly together, as shown in Fig. 2.

Figure 4:
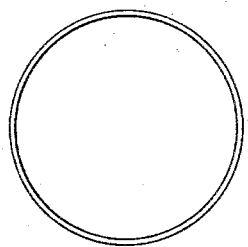

Fig. 4 represents a face view of one half of this target, showing its thickness.

The material of which this ball may be constructed is no part of my invention. Therefore glass, clay, or any other suitable substance may be used.

The rubber band shown in the drawings is employed to hold the two halves together; but any other suitable securing device may be substituted therefor, if preferred.

Having thus fully described my invention, what I claim therein as new, and desire to secure by Letters Patent, is—

A spherical, or nearly spherical, target, made in two parts, with a groove passing round it, to retain a rubber band or other suitable securing device, substantially as shown.

ALFRED C. JOHNSON.

Witnesses:
DANIEL E. POWERS,
THOMAS HAMILTON.